June 5, 1962

N. E. WATSON ET AL 3,037,470

MINIMUM TILLAGE PLANTER

Filed June 29, 1959

INVENTOR.
NORMAN E. WATSON
BY    JOHN W. WATSON

Schmieding and Fultz
ATTORNEYS

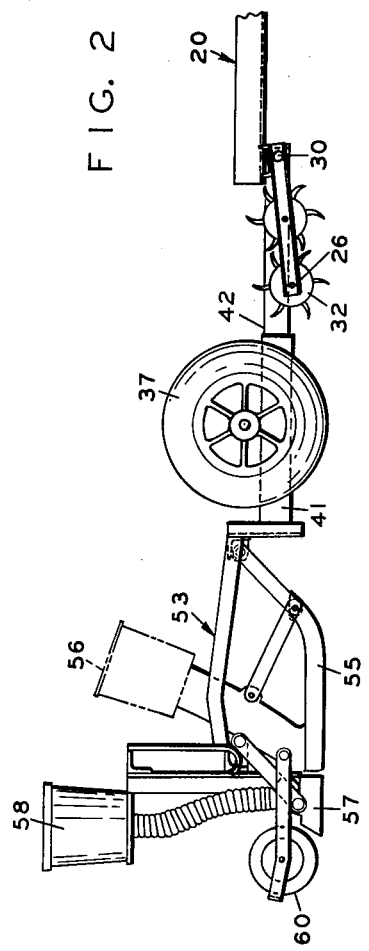
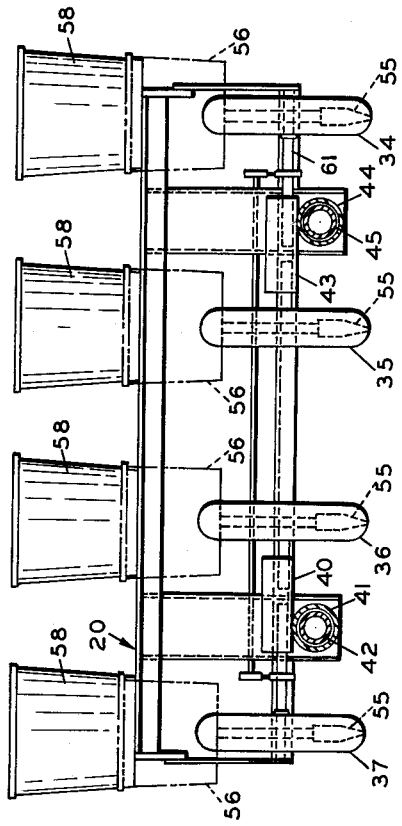

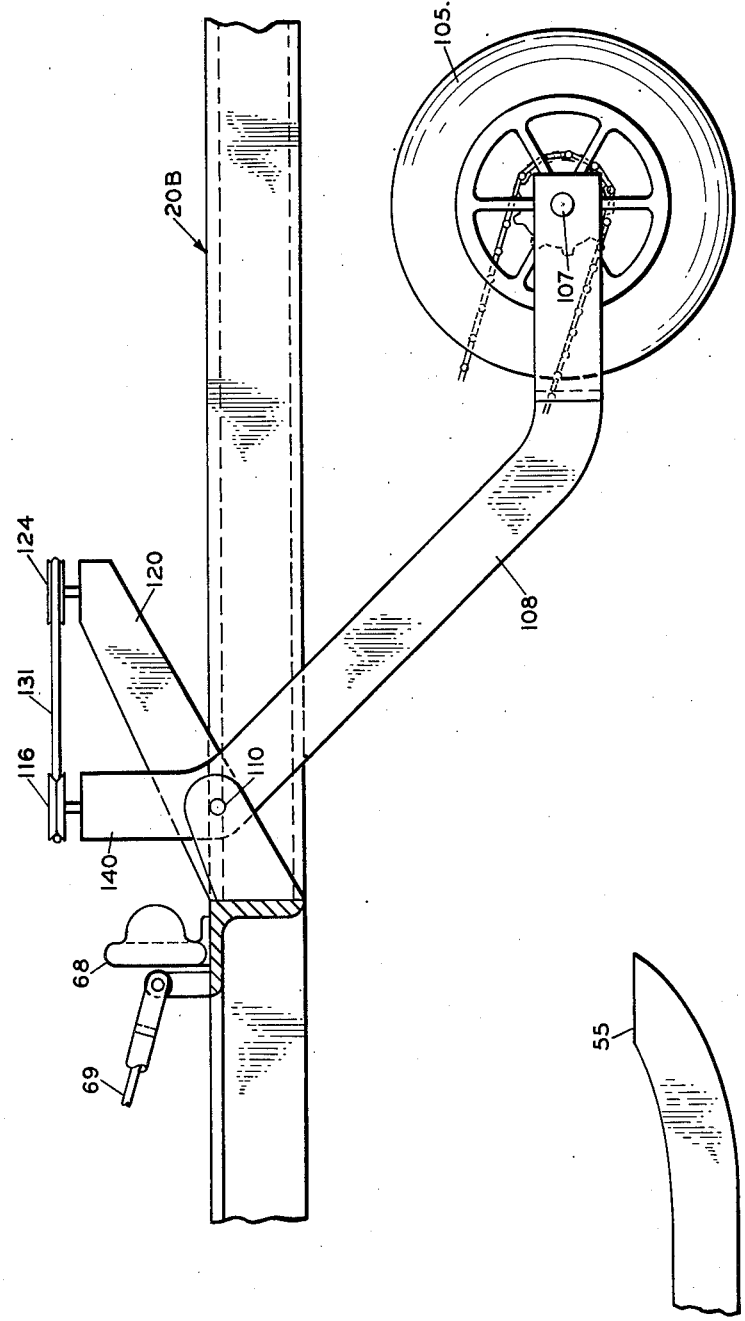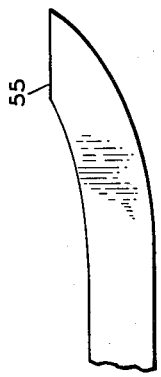

United States Patent Office 3,037,470
Patented June 5, 1962

3,037,470
MINIMUM TILLAGE PLANTER
Norman E. Watson and John W. Watson, both of R.F.D. 3, London, Ohio
Filed June 29, 1959, Ser. No. 823,449
11 Claims. (Cl. 111—52)

This invention relates to apparatus for planting seeds.

In general, the planter apparatus of the present invention is adapted to automatically plant seeds in spaced rows by a novel method which will be referred to herein as minimum tillage planting. This type of planting consists of forming compacted spaced bands of earth along the surface of a field with intermediate wider bands of non-compacted earth intermediate said compacted bands.

The seed is next planted only in the compacted rows, the loosely plowed intermediate non-compacted bands of earth serving to receive and retain rain water and effectively deliver same to the adjacent compacted bands whereby the seeds and plants will be effectively provided with water throughout the growing season.

As one important advantage, minimum tillage planting results in the rapid germination of the seed. This type of planting provides relatively narrow seed beds of compacted earth from which entrapped air has been removed. The seeds are placed on the prepared seed bed and osmotic action causes the moisture present in the earth to move upwardly in the compacted seed beds and into contact with the seeds. Since the seeds are in contact with moist earth the seeds germinate immediately after planting instead of waiting for the arrival of the next rain.

As another important advantage of minimum tillage planting each seed bed which is properly prepared for rapid germination has on each side of it an uncompacted root bed that permits rain to penetrate to the roots of the plants throughout the growing season. In addition, since the soil in the uncompacted root beds is not worked after plowing air will be entrained. Such entrained air is necessary for the growth of beneficial bacteria on the roots of the plant as they spread out into the root beds during the growing season.

As still another advantage of minimum tillage planting the relatively wide uncompacted root beds provide a poor environment for the germination of weed seeds since the subsurface moisture cannot work upwardly through the uncompacted soil by osmotic action.

In the instance of corn planting the seeds need a seed bed for approximately ten days and a root bed for approximately six months' growing season. Hence it will be understood that minimum tillage planting, and apparatus constructed according to the present invention, conditions the field to take care of the specific requirements of both the germinating seed and the growing plants.

In general, the planter apparatus of the present invention comprises a main frame which, in the case of the embodiments illustrated and described herein, is mobilized by attachment to one or more tractors. It will be understood that the planter frame can be designed as a self-propelled vehicle without departing from the spirit of the present invention.

The frame of the present invention is supported by a plurality of laterally spaced compacting wheels, said wheels being spaced at distances equal to the spacings between the compacted rows to be formed. The weight of the apparatus is thereby utilized to achieve a high degree of compacting of the earth.

The rear portion of the planter frame carries a plurality of seed dispensing means laterally spaced at distances equal to the spacings between the compacting wheels that follow whereby each compacting wheel is followed by a respectively longitudinally aligned seed dispensing means.

For purposes of breaking up large clumps of earth present in the plowed field prior to planting, a plurality of hoe means are mounted to the forward portion of the planter frame and each of said hoe means leads and is longitudinally aligned with a respective one of said compacting wheels.

In accordance with the present invention, each of the compacting wheels is attached to the frame by a mount that includes a pressure equalizing means for maintaining substantially equal pressure between the compacting wheels and the ground notwithstanding variations in the vertical positions of the compacting wheels.

It is therefore an object of the present invention to provide a planter apparatus for minimum tillage planting that automatically plants seed in spaced compacted bands of earth separated by intermediate bands of non-compacted earth to more effectively water the seed and growing crop and thereby achieve increased yield per acre.

It is another object of the present invention to provide a planter apparatus of the type described that includes a plurality of laterally spaced compacting wheels, longitudinally aligned with a plurality of seed dispensing means that follow, said wheels being arranged to engage the earth with substantially equal pressure notwithstanding variations in the surface level of the earth whereby spaced equally compacted bands of earth are formed by the compacting wheels.

It is still another object of the present invention to provide a planter apparatus of the type described that includes a plurality of laterally spaced compacting wheels that engage the surface of the earth with substantially equal pressure, a plurality of spaced seed dispensing means each of which follows a respective compacting wheel and is provided with a shoe for forming a furrow, and means for vertically adjusting the height of said shoes relative to said compacting wheels.

Further objects and advantages of the present invention will be apparent from the following description, reference being had to the accompanying drawings wherein preferred forms of embodiments of the invention are clearly shown.

In the drawings:

FIG. 2 is a side elevational view of the apparatus of FIG. 1;

FIG. 3 is a front view, partially in section, of the apparatus of the preceding figures, the section being taken along the line 3—3 of FIG. 1;

FIG. 7 is a partial side elevational view of the apparatus of FIG. 6, the view being taken along the line 7—7 of FIG. 6.

Figure 1:
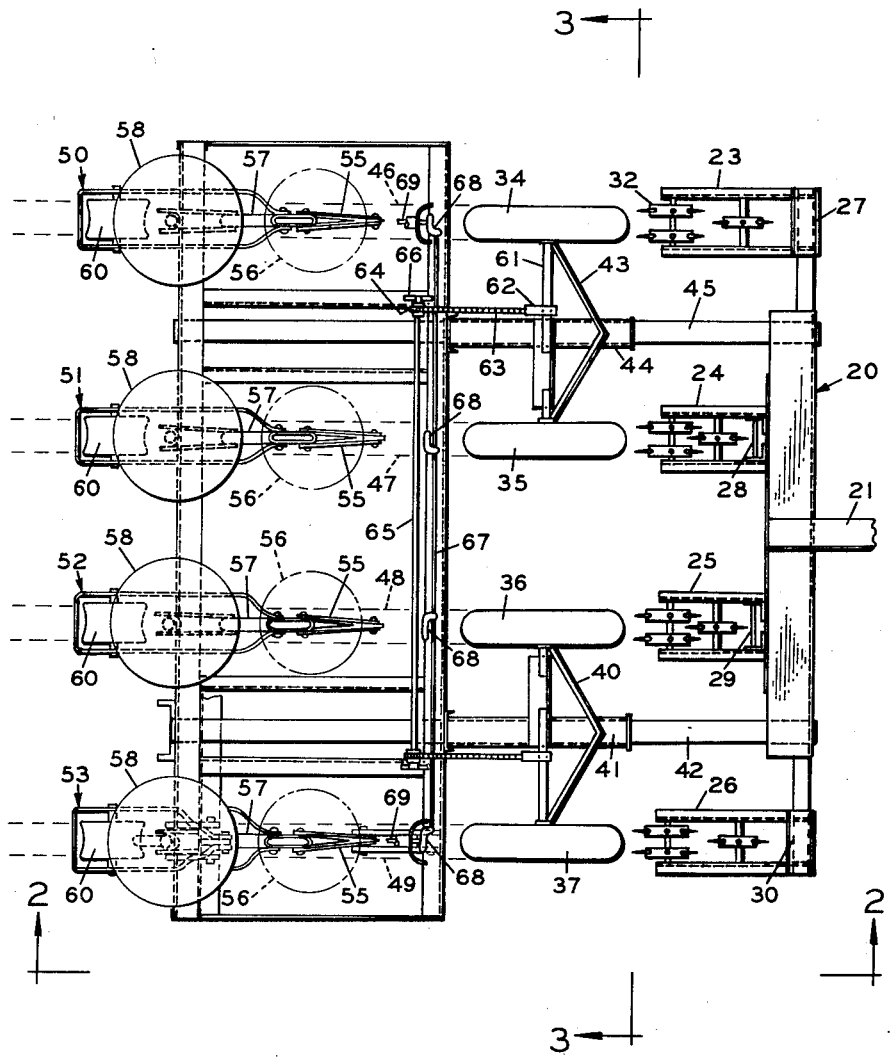
FIG. 1 is a top elevational view of a minimum tillage planter apparatus constructed according to the present invention and comprising one aspect thereof showing some conventional parts removed.

Referring in detail to the drawings, FIGS. 1 through 3 illustrate a planter apparatus constructed according to the present invention that includes a frame indicated generally at 20 provided with one or more draw bars 21 for tractor attachment. A plurality of hoe means 23—26 are mounted to the forward portion of frame 20 at pivots 27—30. Each of the hoe means includes a plurality of spiked wheels 32 that break up the clumps of earth present in the field after plowing.

Each of the hoe means is followed by a respective one of a plurality of supporting means including ground engaging portions which may be in the form of compacting wheels 34—37, said supporting means serving to compact the hoed bands of earth.

The right pair of compacting wheels 36—37 is mounted on an axle means 40 that includes a tubular pivot portion 41 rotatably carried by a frame pivot rod 42 and a laterally extending member or axle 61.

Similarly, the left pair of compacting wheels 34—35 is mounted on an axle means 43 that includes a tubular pivot portion 44 rotatably carried by a frame pivot rod 45.

With continued reference to FIG. 1 compacting wheels 34—37 form a plurality of spaced compacted bands of earth illustrated in dotted delineation and indicated at 46—49.

The rear portion of frame 20 carries a plurality of seed dispensing means indicated generally at 50—53, each of which includes a shoe 55 longitudinally aligned with a center of a respective compacting wheel 34—37, a seed hopper 56, seed releasing mechanism 57, a fertilizer hopper 58, and a furrow closing means or compacting drum 60.

With continued reference to FIGS. 1–3, seed releasing mechanisms 57 are driven by axle 61 that rotates with wheel 34, a sprocket 62, chain 63, sprocket 64, rod 65, gears 66, shaft 67, beveled gears 68, and shafts 69.

In operation of the apparatus of FIG. 1, frame 20 is attached to a tractor by draw bar 21 and is driven across the surface of a plowed field whereby hoe means 23—26 break up the clumps in the plowed earth.

The hoed bands of earth are next engaged by the compacting wheels 34—37 which form the spaced compacted bands 46—49 indicated in dotted delineation in FIG. 1. Due to the pivotal mounting of axle means 40 and 43 compacting wheels 34—37 will engage the earth with equal pressure notwithstanding variations in the level thereof. For example, if wheel 37 encounters a high stretch of ground axle means 40 will pivot about pivot rod 42 to permit wheel 37 to rise relative to wheel 36, it being understood that both wheels will engage the earth with the same pressure since the frame load is applied to the axle means at the pivot location 41—42 halfway between the wheels 36 and 37.

The above explanation also applies to the left pair of compacting wheels 34—35.

As the frame is moved across the field, the shoes 55 dig into the center of the compacted bands 46—49 and form furrows for receiving the seed deposited by seed dispensing means 57.

The seeded furroughs are closed and compacted by the compacting drums 60 that follow the seed dispensing apparatus and the outlet from fertilizer hopper 58.

With continued reference to FIGS. 1–3, the apparatus can be provided with means for vertically adjusting frame 20 relative to compacting wheels 34—37. In such embodiment the axle members 61 would be replaced with a left axle portion having an inner end pivoted to tube 44 and a right axle portion having its inner end pivoted to tube 44. A fluid actuated cylinder, not illustrated, would be operatively interposed between the tube 44 and the right and left axle portions whereby pressurization of said hydraulic cylinder would force both the compacting wheels 34 and 35 simultaneously downwardly relative to tube 44. This would of course raise frame 20 relative to the compacting wheels.

In this modification the frame can be lowered by releasing fluid from the cylinder operatively interposed between tube 44 and the right and left axle portions.

Figure 4:
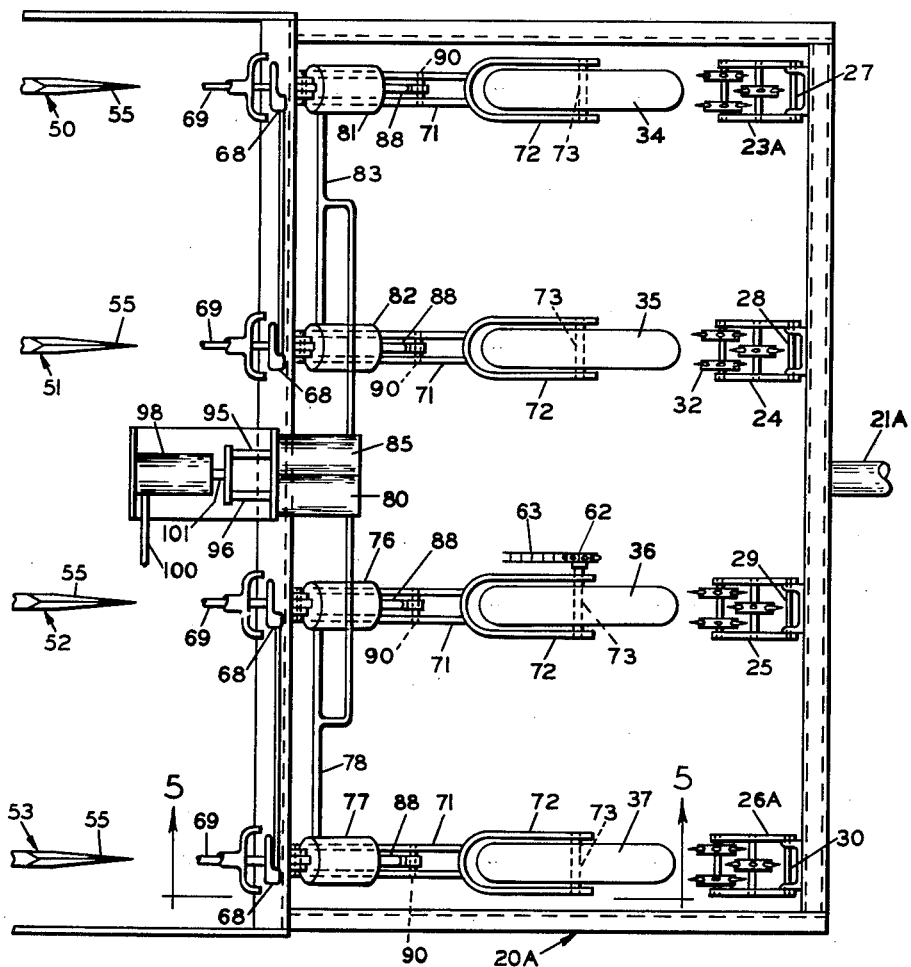
FIG. 4 is a partial top view of a minimum tillage apparatus constructed according to the present invention and comprising a second aspect thereof.
Figure 5:
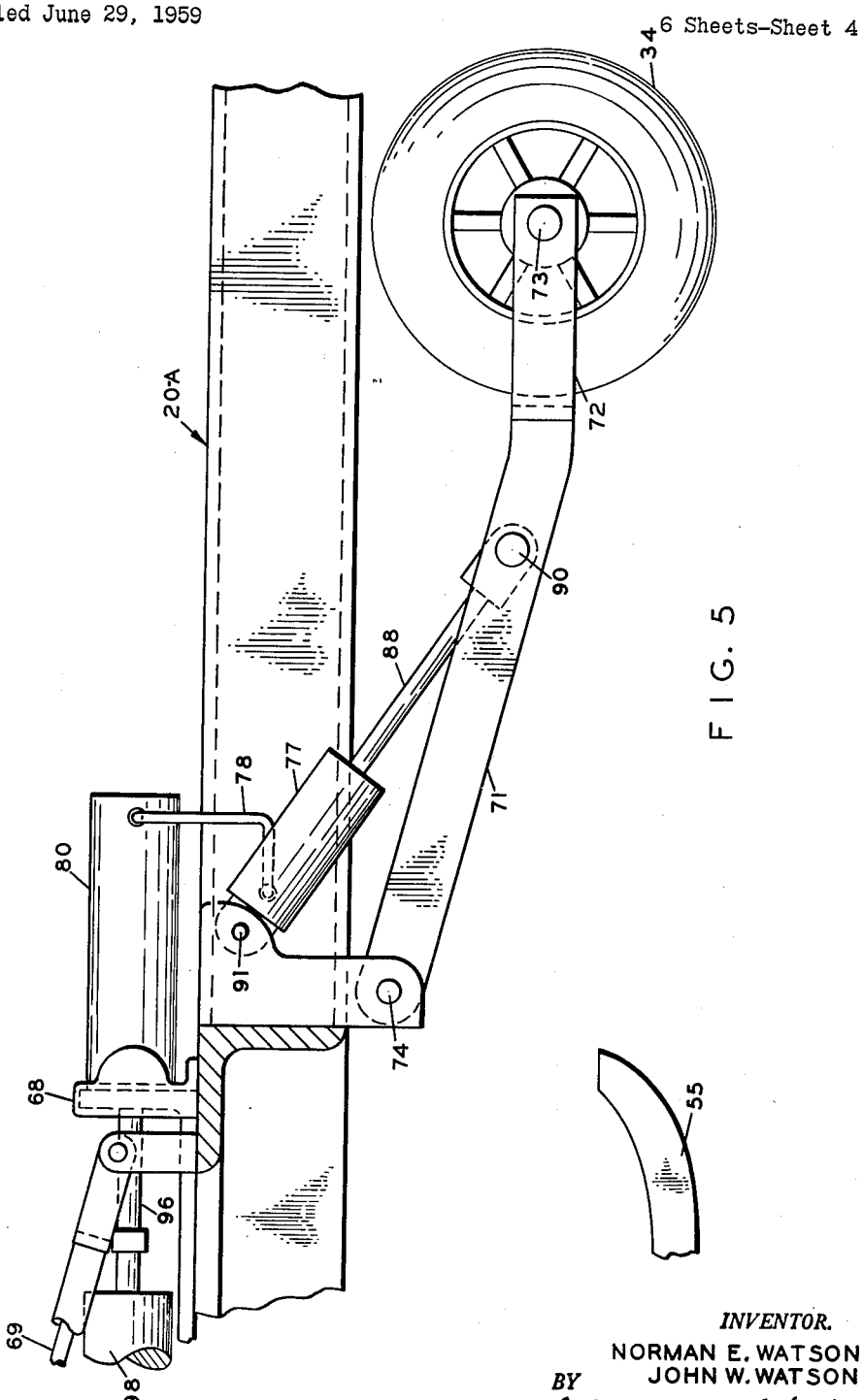
FIG. 5 is a partial side elevational view of the apparatus of FIG. 4, the view being taken along the line 5—5 of FIG. 4.

Reference is next made to FIGS. 4 and 5 which illustrate a modification of the present invention wherein the compacting wheels 34—37 are hydraulically mounted to a frame means 20–A so as to engage the earth with equal pressure. In the apparatus of FIG. 4, the hoe means and planter means are substantially identical to those of the modification of FIGS. 1–3 and are hence designated by identical numerals.

Referring particularly to the hydraulic wheel mounting apparatus of FIGS. 4 and 5, each of the wheels 34—37 is mounted to frame 20–A by a wheel mounting member or arm 71. Each arm includes a fork portion 72, an axle 73, and an upper frame pivot 74. Two hydraulic cylinders 76 and 77 are commonly connected by a line 78 to a master cylinder 80 and hydraulic cylinders 81 and 82 are commonly connected by a line 83 to a fluid translating means or master cylinder 85. A plurality of rods 88 each includes an upper end connected to a piston, not illustrated, and a lower end attached to arm 71 at pivot pin 90, the upper end of cylinder 77 being attached to frame 20–A at a pivot pin 91.

A piston rod 95 is slidably carried in master cylinder 85 and a second rod 96 is carried in master cylinder 80 said piston rods being concurrently actuated by a hydraulic cylinder 98, the latter being pressurized and depressurized via hydraulic line 100 leading from a source of pressurized fluid, such as a pump, mounted on the tractor.

In operation of the apparatus of FIGS. 4 and 5, a valve not shown controlling the flow of hydraulic fluid through line 100 to hydraulic cylinder 98 is maintained normally closed whereby a piston rod 101, and a piston attached thereto but not illustrated, are maintained stationary such that piston rods 95 and 96 remain fixed whereby the total quantity of fluid in power cylinders 81 and 82 and 76 and 77 remains constant.

As the frame 20–A is moved across a field, and one of the wheels, for example wheel 37, encounters a high stretch of ground wheel 37 will rise relative to the frame and wheel 36 will drop relative to the frame since hydraulic fluid is free to pass from power cylinder 77 through line 78 to power cylinder 76.

Similarly, if wheel 34 engages a high stretch of ground it will rise and its companion wheel 35 will drop since fluid is free to pass from power cylinder 81 through line 83 to power cylinder 82.

If one of the inner wheels 35 or 36 encounters a high stretch of ground it will rise relative to the frame and a respective companion outer wheel will drop relative to the frame since hydraulic fluid is free to pass from an inner power cylinder to a companion outer power cylinder.

If the operator should desire to raise the planter shoes 55 relative to the compacting wheels 34—37, this can be accomplished by opening a valve, not illustrated, to connect power cylinder 98 to the source of pressurized hydraulic fluid. This extends piston rods 101, 95, and 96 whereby hydraulic fluid is caused to flow from master cylinder 80 to power cylinders 76 and 77 and from master cylinder 85 to power cylinders 81 and 82. The rods 88 are thereby extended from the power cylinders which causes frame 20–A, and hence planter shoes 55, to be raised vertically relative to compacting wheels 34—37.

When it is desired to lower planter shoes 55, relative to compacting wheels 34—37, the operator can accomplish this by opening a valve to connect power cylinder 98 to reservoir whereby fluid is released from hydraulic cylinder 98 and rods 95 and 96, and pistons attached thereto, are withdrawn relative to master cylinders 80 and 85. When rod 96 is withdrawn, fluid is released from power cylinders 76 and 77 to master cylinder 80. Similarly, when rod 95 is withdrawn fluid is released from power cylinders 81 and 82 to master cylinders 85. This causes the rods 88 to be retracted relative to the power cylinders whereby frame 20–A, and hence planter shoes 55, are lowered relative to compacting wheels 34—37.

Figure 6:
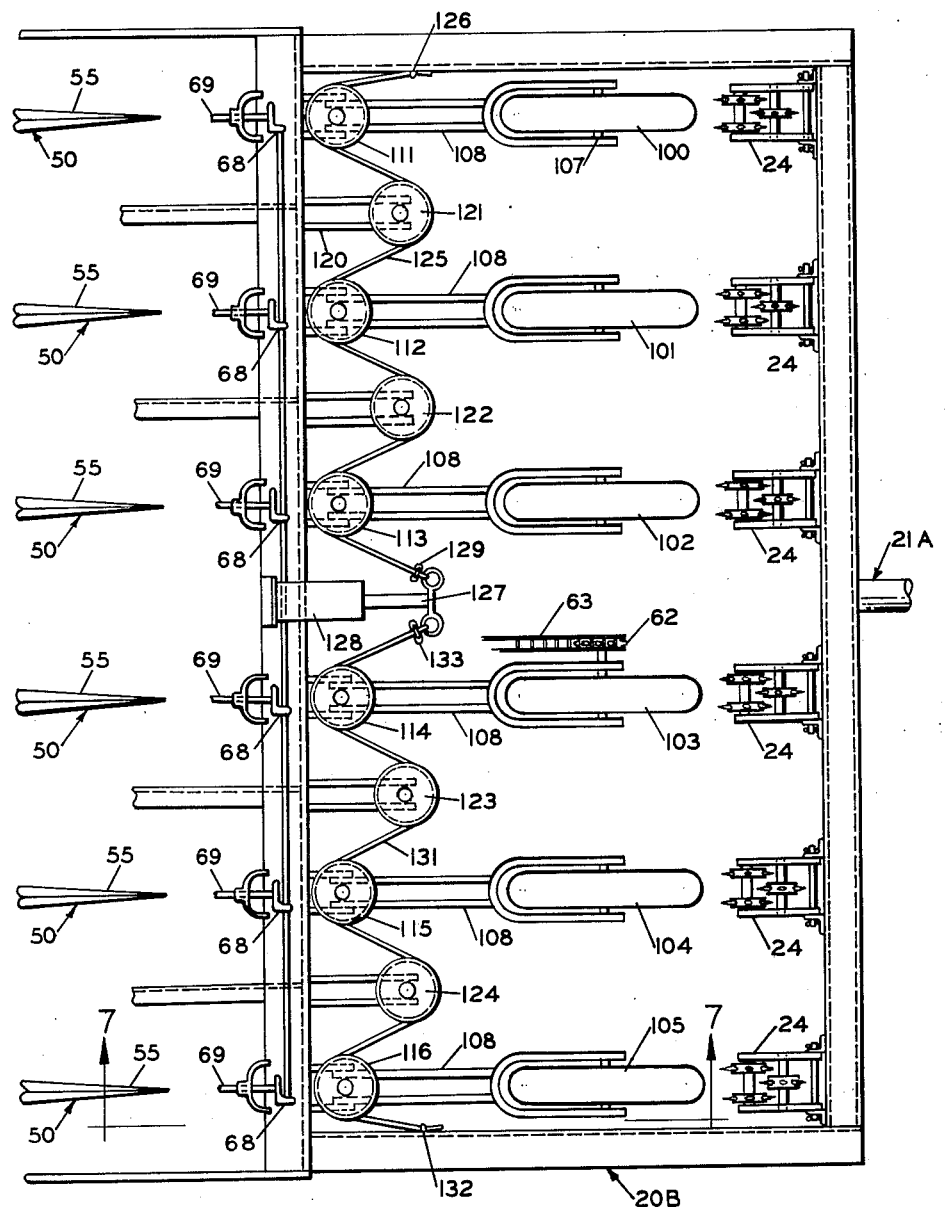
FIG. 6 is a partial top elevational view of a planter apparatus constructed according to the present invention and comprising a third aspect thereof.

Reference is next made to FIGS. 6 and 7 which illustrate a second modification wherein six compacting wheels 100—105 are moutned to a frame 20–B by a novel mechanical linkage whereby the wheels engage the earth with equal pressure notwithstanding variations in the ground level.

Each of the wheels 100—105 includes an axle 107 supported on the lower end of a wheel mounting member or pivoted arm 108, the upper end of said pivoted arm being mounted to frame 20-B at a pivot pin 110.

The upper ends of pivot arms 108 carry a plurality of cable engaging means or rotatable pulleys 111—116 and frame members 120 form stationary mounts for a plurality of a cable engaging means or pulleys 121—124.

With continued reference to FIGS. 6 and 7, a right steel cable 125 is attached at one end of frame 20-B by a fastener 126 and at the other end to a power means such as a piston rod 127 of hydraulic cylinder 128 at a fastener 129.

Similarly, a left steel cable 131 is secured at one end to frame 20-B by a fastener 132 and at the other end to ram 127 of hydraulic cylinder 128 at a fastener 133.

Considering first the three right wheels 100—102 if any one of the wheels encounters a high stretch of ground the upper end of pivot arm 108, and the pulley mounted thereon, will move forwardly to permit the wheel to rise. At the same time the other three movable pulleys on the right side of the frame will move rearwardly to permit said other three wheels to drop since steel cable 125 must maintain its constant length.

It will be understood that since the tension along cable 125 is constant it must follow that all three of the right wheels will engage the ground with equal pressure.

The operation of the three wheels 103—105 on the left side of the planter is the same as the operation of the three wheels on the right side of the planter.

If the operator desires to raise frame 20-B relative to wheels 100—105 hydraulic cylinder 128 is pressurized whereby the upper ends 140 of pivot arms 108 move rearwardly and thereby cause frame 20-B to move upwardly. If the operator desires to lower the frame hydraulic cylinder 128 is drained whereby piston rod 127 moves inwardly permitting the upper ends 140 of pivot arms 108 to move forward whereby frame 20-B is lowered.

It will be noted from FIG. 6 that each of the wheels 100—105 follows a hoe means 24 of the type previously described, and each of the compacting wheels is followed by a seed dispensing means 50, including a shoe 55 and associated apparatus previously described herein.

While the forms of embodiments of the present invention as herein disclosed constitute preferred forms, it is to be understood that other forms might be adopted, all coming within the scope of the claims which follows.

We claim:

1. A minimum tillage planter comprising, in combination, a frame; a plurality of laterally spaced seed dispensing means mounted rearwardly on said frame for dispensing seed in parallel paths in the direction of travel of said planter; a plurality of supporting means mounted forwardly on said frame and including ground engaging portions confined to substantial alignment with said paths for supporting said frame and compacting said paths of said seed dispensing means; and mounting means vertically movably attaching each of said supporting means to said frame including pressure equalizing means for maintaining substantially equal pressure between each of said ground engaging portions and the ground notwithstanding variations in the vertical position of said ground engaging portions.

2. The planter defined in claim 1 that includes a plurality of hoe means mounted to said frame forwardly of said ground engaging portions of said supporting means.

3. The planter defined in claim 1 that includes a plurality of furrough closing means mounted to said frame rearwardly of said ground engaging portions of said supporting means.

4. A minimum tillage planter comprising, in combination, a frame; a plurality of laterally spaced seed dispensing means mounted rearwardly on said frame for dispensing seed in parallel paths in the direction of travel of said planter; a plurality of supporting means mounted forwardly on said frame including ground engaging portions confined to substantial alignment with said paths for supporting said frame and compacting said paths of said seed dispensing means; and mounting means vertically movably attaching each of said supporting means to said frame, said mounting means including a laterally extending member mounted to said frame for pivotal movement about an axis extending longitudinally of said frame, one of said ground engaging portions being mounted on said laterally extending member on one side of said axis and another of said ground engaging portions being mounted on said laterally extending member on the other side of said axis.

5. The planter defined in claim 4 wherein said laterally extending member is in the form of an axle member and said ground engaging portions are in the form of wheels.

6. A minimum tillage planter comprising, in combination, a frame; a plurality of laterally spaced seed dispensing means mounted rearwardly on said frame for dispensing seed in parallel paths in the direction of travel of said planter; a plurality of supporting means mounted forwardly on said frame including ground engaging portions confined to substantial alignment with said paths for supporting said frame and compacting said paths of said seed dispensing means; mounting means vertically movably attaching each of said supporting means to said frame, said mounting means including a plurality of hydraulic cylinders, each of said cylinders being connected between one of said supporting means and said frame and including a chamber; and conduit means connecting said chambers of said hydraulic cylinders.

7. The planter defined in claim 6 wherein said supporting means includes a plurality of wheel mounting members each of which includes an upper end movably attached to said frame and a lower end; a plurality of compacting wheels mounted on said lower ends of said wheel mounting members and forming said ground engaging portions.

8. The planter defined in claim 6 that includes a fluid translating means for delivering and releasing hydraulic fluid to and from said hydraulic cylinders for varying the height of said frame relative to said ground engaging portions of the supporting means.

9. A minimum tillage planter comprising, in combination, a frame; a plurality of laterally spaced seed dispensing means mounted rearwardly on said frame for dispensing seed in parallel paths in the direction of travel of said planter; a plurality of supporting means mounted forwardly on said frame including ground engaging portions confined to substantial alignment with said paths for supporting said frame and compacting said paths of said seed dispensing means; mounting means vertically movably attaching each of said supporting means to said frame, said mounting means including a plurality of members each of which is movably mounted to said frame and includes a lower end, said ground engaging portions being on said lower ends; a plurality of cable engaging means each of which is mounted on one of said members; a pulley engaging means mounted on said frame; and a cable including ends attached to said frame and an intermediate portion engaged by said cable engaging means.

10. The planter defined in claim 9 that includes a power means connected between said cable and said frame, actuation of said power means serving to vary the height of said frame relative to said ground engaging portion.

11. The planter defined in claim 9 wherein the ground engaging portions are formed by a plurality of wheels rotatably mounted on the lower ends of said mounting members.

(References on following page)

References Cited in the file of this patent

UNITED STATES PATENTS

| | | |
|---|---|---|
| 492,255 | Ashurst | Feb. 21, 1893 |
| 910,337 | Willis | Jan. 19, 1909 |
| 1,021,379 | Schutt | Mar. 26, 1912 |
| 1,282,124 | Phillips | Oct. 22, 1918 |
| 1,370,777 | Barry | Mar. 8, 1921 |
| 1,436,946 | Constable | Nov. 28, 1922 |
| 1,460,236 | Ford | June 26, 1923 |
| 1,548,391 | Steiner | Aug. 4, 1925 |
| 2,323,044 | Hyland | June 29, 1943 |
| 2,423,585 | Daugherty | July 8, 1947 |
| 2,675,247 | Meng | Apr. 13, 1954 |
| 2,930,335 | Hage | Mar. 29, 1960 |

FOREIGN PATENTS

| | | |
|---|---|---|
| 200,858 | Great Britain | July 23, 1923 |